United States Patent [19]

Marcus

[11] Patent Number: 5,013,335
[45] Date of Patent: May 7, 1991

[54] PROCESS FOR SEQUESTERING AMMONIA AND THE ODOR ASSOCIATED THEREWITH

[75] Inventor: Bonita K. Marcus, Rye, N.Y.

[73] Assignee: UOP, Des Plaines, Ill.

[21] Appl. No.: 247,642

[22] Filed: Sep. 22, 1988

Related U.S. Application Data

[63] Continuation-in-part of Ser. No. 67,977, Jun. 30, 1987, Pat. No. 4,795,482.

[51] Int. Cl.$^5$ .............................................. B01D 53/04
[52] U.S. Cl. ............................................ 55/70; 55/75
[58] Field of Search .................. 55/70, 75; 210/681; 423/328 C

[56] References Cited

U.S. PATENT DOCUMENTS

| | | | |
|---|---|---|---|
| 1,787,875 | 1/1931 | Perrott et al. | 55/70 |
| 3,033,641 | 5/1962 | Thomas, Jr. | 210/681 |
| 3,266,973 | 8/1966 | Crowley | 55/70 X |
| 3,683,592 | 8/1972 | Kamm et al. | 55/389 X |
| 3,698,157 | 10/1972 | Allen et al. | 55/75 X |
| 3,723,308 | 3/1973 | Breck | 210/681 |
| 3,724,170 | 4/1973 | Allen et al. | 55/75 X |
| 3,732,326 | 5/1973 | Chen | 55/75 X |
| 3,772,852 | 11/1973 | Tamura et al. | 55/70 X |
| 3,789,797 | 2/1974 | Brewer | 119/1 |
| 3,798,876 | 3/1974 | Kennedy | 55/74 X |
| 3,960,520 | 6/1976 | Allen | 55/75 X |
| 4,019,879 | 4/1977 | Rabo et al. | 55/75 X |
| 4,019,880 | 4/1977 | Rabo et al. | 55/75 X |
| 4,061,724 | 12/1977 | Grose et al. | 423/335 |
| 4,073,865 | 2/1978 | Flanigen et al. | 423/335 X |
| 4,085,704 | 4/1978 | Frazier | 119/1 |
| 4,090,981 | 5/1978 | Rodewald | 55/75 X |
| 4,130,484 | 12/1978 | Marwil et al. | 55/70 X |
| 4,257,885 | 3/1981 | Grose et al. | 55/75 X |
| 4,309,281 | 1/1982 | Dessau | 55/75 X |
| 4,331,694 | 5/1982 | Izod | 423/328 C X |
| 4,344,851 | 8/1982 | Sherman et al. | 210/681 X |
| 4,344,927 | 8/1982 | Young | 423/335 X |
| 4,401,572 | 8/1983 | Chu et al. | 210/681 |
| 4,437,429 | 3/1984 | Goldstein et al. | 119/1 |
| 4,534,775 | 8/1985 | Frazier | 55/75 X |
| 4,604,110 | 8/1986 | Frazier | 55/389 X |
| 4,636,373 | 1/1987 | Rubin | 423/339 X |
| 4,648,977 | 3/1987 | Garg et al. | 210/673 |
| 4,677,096 | 6/1987 | van der Smissen | 55/75 X |
| 4,686,198 | 8/1987 | Bush et al. | 210/681 X |
| 4,717,483 | 1/1988 | Bush et al. | 210/681 |

FOREIGN PATENT DOCUMENTS

| | | | |
|---|---|---|---|
| 50-044189 | 4/1975 | Japan | 55/70 |
| 51-068967 | 6/1976 | Japan | 210/681 |
| 59-225790 | 12/1984 | Japan | 210/681 |
| 776467 | 6/1957 | United Kingdom | 210/681 |

*Primary Examiner*—Robert Spitzer
*Attorney, Agent, or Firm*—Thomas K. McBride; Richard G. Miller

[57] ABSTRACT

Ammonia, particularly aqueous ammonia is sequestered in unexpected large amounts on zeolite molecular sieves having high proportions of silica with respect to alumina in their crystal frameworks. While conventional adsorption mechanisms are to some degree involved, it is apparent from the fact that the characteristic odor of ammonia is not detectable by the human sense of smell over the ammonia-loaded adsorbents indicates that other mechanisms are operable. These propeties provide the basis for processes and products which are useful in removing ammonia from an environment to alleviate health hazards or unpleasant odor.

6 Claims, No Drawings

PROCESS FOR SEQUESTERING AMMONIA AND THE ODOR ASSOCIATED THEREWITH

RELATED APPLICATIONS

This application is a continuation-in-part of application Ser. No. 067,977 filed June 30, 1987, now U.S. Pat. No. 4,795,482.

BACKGROUND OF THE INVENTION

1. Field of the Invention

The present invention relates in general to the sequestration of ammonia, and more particularly to the process for removing ammonia from a liquid or gaseous medium by contact with a crystalline molecular sieve having certain physical and chemical properties hereinafter elucidated. The invention also relates to molecular sieve compositions suitable for use in the process.

2. Description of the Prior Art

Ammonia is a colorless gas with a pungent odor which in small concentrations in the atmosphere is merely objectionable for its assault on the olfactory sense organs, but in larger concentrations is toxic and harmful to animal tissue. Ammonia in concentrations as low as 20 ppm (volume) is detectable by the human sense of smell, and at concentrations of as low as 100 ppm becomes irritating as an odor and can bring tears to the eyes. Ammonia gas is extremely soluble in water particularly at ambient room temperature and below. At 0° C for instance, one volume of water dissolves 1298 volumes of gaseous ammonia. At 20° C a lesser but still substantial 710 volumes of the gas are dissolve. Whereas hazardous levels of ammonia presence are ordinarily encountered in industrial environments, the merely objectionable, i.e. malodorous, concentrations of ammonia are usually encountered as the product of bacterial action on nitrogeneous organic matter, particularly animal excretia.

Being a highly polar compound, the adsorption of ammonia, either from gas streams or aqueous media, has long been carried out using a wide variety of adsorbent media. Commonly employed solid adsorbents include activated charcoal or active carbon, silica gel, activated alumina, kieselguhr, fullers earth and other clay minerals, and zeolites of both the crystalline and the amorphous types. A mixture of alfalfa, bentonite clay and a binder is proposed in U.S. Pat. No. 3,789,799 for adsorbing and neutralizing odors of animal waste matter. In U.S. Pat. No. 4,437,429, the use of a hydrated zeolite in admixture with clay is proposed as being particularly useful for the control of odors from pet litter, it being observed that the use of zeolites by themselves as litter material has generally been unsuccessful due to their poor water adsorption properties as compared with clays. For the adsorption of certain odors from animal litter using a mixture of clays and zeolites, it is proposed in U.S. Pat. No. 4.437.429 that the zeolite constituent not only be employed in its hydrated state, but also that the water of hydration be the original water of hydration. It is said to be not sufficient that water is added to a previously heat-treated zeolite from which the original water of hydration was driven off.

In general, when zeolites have been utilized for the suppression of ammonia or other odors, the preferred species have been those with a low framework Si/Al ratio and high degree of adsorption capacity for water or other highly polar molecules such as ammonia or hydrogen sulfide. The disclosure of the aforesaid U.S. Pat. No. 4,437,429 is somewhat remarkable for its specific disclosure of may of the class of so-called high silica zeolites which are synthesized using organic templating agents such as the tetraalkylammonium ions. These include ZSM-5. ZSM-11, ZSM-12 and ZSM-23. The preferred zeolite species is the natural mineral clinoptilolite, however, which has a nominal framework $SiO_2/Al_2O_3$ molar ratio of about ten. It has also been proposed, U.S. Pat. No. 4,648,977, to use high-silica molecular sieves, including the silica polymorph silicalite, to adsorb toxic organic materials, from aqueous media for water purification purposes, but for the removal of dissolved ammonia it has been the common practice to utilize high-alumina zeolites such as clinoptilolite, eronite, mordenite, ferrierite, zeolite L, zeolite T, zeolite W, zeolite F and synthetic mordenite, for two reasons. Firstly, the large number of cationic sites in the high alumina zeolites increased the number of cations which could be ion exchanged with ammonium ions, ion exchange being considered the principal mechanism involved. Secondly, the adsorptive capacity of zeolites for molecules having a high permanent dipole moment was believed to be enhanced by the electromagnetic environment within the zeolite void space produced by the arrangement of the cation sites of the zeolite structure.

SUMMARY OF THE INVENTION

It has been found that ammonia can be sequestered in unexpectedly large amounts and to a degree whereby the characteristic odor of ammonia is not detectable by the human olfactory detection level by contact at a temperature within the range of −25° C. to 100° C., preferably 0° C. to 40° C., with a crystalline siliceous molecular sieve having an adsorptive capacity for water at 25° C. and 4.6 torr of less than 10 weight per cent and a frame work $SiO_2/Al_2O_3$ molar ratio of from about 50 to infinity, preferably from 200 to 500. The zeolite having the faujasite crystal structure, i.e. classified in the "ATLAS OF ZEOLITE STRUCTURE TYPES", W. M. Meier and D. H. Olson, Published by the Structure Commission of the International Zeolite Association (1978) as "FAU", alone or in combination with a silica polymorph, such as silicalite, is found to exhibit a large capacity for adsorbed ammonia coupled with the ability to maintain the adsorbate in an odor-free manner, and are preferred compositions.

DETAILED DESCRIPTION OF THE INVENTION

The siliceous molecular sieves suitably employed in the practice of the invention include the microporous crystalline aluminosilicates, i.e., the zeolitic molecular sieves as well as the so-called silica polymorphs. With respect to the latter compositions, their crystal lattices are ideally formed entirely of $SiO_2$ tetrahedral units, but the as-synthesized forms commonly contain at least trace amounts of aluminum derived from aluminum impurities in the synthesis reagents. The aluminosilicate molecular sieves comprise the large class of well-known crystalline zeolites. These high-silica molecular sieves are either commercially available or are prepared by methods, well-known in the art, involving direct hydrothermal synthesis or involving certain types of crystal lattice dealuminations. A comprehensive review article by E. M. Flanigen concerning both "high" Si/Al zeolites and silica molecular sieves is published in "Proc.

5th Int. Conf. Zeolites, Naples, 1980", L. V. C. Rees, ed., Heyden, London, pp.760–780. This article is incorporated herein by reference.

It is a critical aspect of the present invention that the adsorptive capacity of the siliceous molecular sieve employed in less than 10 weight percent, preferably less than 6 weight percent, when measured at 25° C. and a water vapor pressure ($p/p_o$) of 4.6 torr. The efficacy of the molecular sieves employed in the practice of the present invention is not dependent upon the presence of the water of hydration present in the internal cavities of the microporous structure as a result of their hydrothermal formation. In fact, at least a major proportion, usually substantially all, of this original water of hydration is removed in the process of removing any pore-blocking templating agent which may be present in the adsorbent. Calcination effectively removes the organic moieties. Also, water washing or washing with a caustic or dilute mineral acid solution is advantageously utilized to remove extraneous synthesis reagents from the pore system. Lowering of the alkali metal content, particularly the non-zeolitic, i.e., occluded alkali metal compounds can also be beneficial. These procedures also serve to remove the original water of hydration.

It is another critical aspect that the number of $AlO_2$ tetrahedral units of the crystal lattice, if present at all, be very small compared with the number of $SiO_2$ tetrahedral units. It has been observed that there appears to be some correlation between the framework $SiO_2/Al_2O_3$ ratio and the adsorptive capacity for water, i.e., the so-called hydrophobicity, of siliceous molecular sieves.

It is known that for the successful elimination of odors generally, including ammonia, it is essential to effectively isolate the source molecules to a level beneath their detection threshold, which in almost all instances is an extremely low concentration level.

Since even a microgram of ammonia in a 50 cc "sniff" of atmospheric air is detectable as an odor, it is necessary to effectively sequester ammonia on the molecular sieve adsorbents employed in the present invention to an uncommon degree. This is not to be expected in the case of these so-called hydrophobic (organophilic) adsorbents in which the relative absence of cation sites is universally believed to favor the adsorption of non-polar hydrocarbons and to exhibit only modest adsorption affinity for polar molecular species such as water. In fact, both water and ammonia are strongly adsorbed in low-silica zeolites such as zeolite X and zeolite A. In the present invention, however, the zeolitic adsorbents show high adsorptive affinity for ammonia and low adsorptive affinity for water, for reasons which have not yet been fully explained.

Whatever the reason, it is found that the class of siliceous molecular sieves defined hereinabove, from which the original, as-synthesized water of hydration has preferably been substantially removed, and which have a framework $SiO_2/Al_2O_3$ molar ratio of at least 50, a capacity for adsorbed water of not greater than 10, and preferably not greater than 6, weight percent when measured at 25° C. and a water vapor pressure ($p/p_o$) of 4.6 torr, function in an extraordinary manner with respect to ammonia adsorption. Many of the synthetic zeolites prepared using organic templating agents are readily prepared in a highly siliceous form—some even from reaction mixtures which have non intentionally added aluminum. These zeolites are markedly organophilic and include ZSM-5 (U.S. Pat. No. 3,702,886); ZSM-11 (U.S. Pat. No. 3,709,979); ZSM-35 (U.S. Pat. No. 4,016,245); ZSM-23 (U.S. Pat. No. 4,076,842); and ZSM-38 (U.S. Pat. No. 4,046,859) to name only a few. It has been found that the silica molecular sieves known as silicalite and F-silicalite are particularly suitable for use in the present invention and are thus preferred. These materials are disclosed in U.S. Pat. Nos. 4,061,724 and 4,073,865, respectively. To the extent the aforesaid siliceous sieves are synthesized to have $SiO_2/Al_2O_3$ ratios greater than 50, they are frequently suitable for use in the present process without any additional treatment to increase their degree of hydrophobicity. Molecular sieves which cannot be directly synthesized to have both sufficiently high Si/Al ratios and/or degree of hydrophobicity can be subjected to dealumination techniques, flourine treatments and the like, which result in organophilic zeolite products. High-temperature steaming procedures for treating zeolite Y which result in hydrophobic product forms are reported by P. K. Maher et al., "Molecular Sieve Zeolites," Advan Chem. Ser. 101, American Chemical Society, Washington, D.C., 1971, p.266. A more recently reported procedure applicable to zeolite species generally, involves dealumination lattice site. This process is disclosed in U.S. Pat. No. 4,503,023 issued Mar. 5, 1985 to Skeels et al. Halogen or halide compound treatments for zeolites to increase their hydrophobicity are disclosed in U.S. Pat. Nos. 4,569,833 and 4,297,335.

With respect to the foregoing adsorbents, it is important that the pore system be open so that the internal cavities of the crystals be accessible to the ammonia molecules, even in their hydrate form. In the case of the aluminosilicates or silica polymorphs produced using large organic templating ions such as tetraalkylammonium ions, it is necessary to remove charge balancing organic ions and any occluded templating material in order to permit adsorption of the ammonia molecules. In such a removal process and also in the removal of inorganic debris, the original water of hydration is also removed. Upon exposure to the atmosphere a portion of the water of hydration is reacquired, but this does not affect the characteristics of the molecular sieve which are essential for the practice of the present invention, i.e., the molecular sieve can be employed in either a hydrated or dehydrated state, but in general the dehydrated state is preferred. In the case of most of the dealumination procedures referred to above, the original water of dehydration is also removed, and can similarly be replaced, if desired, for the practice of the invention.

It should be pointed out that it is the framework $SiO_2/Al_2O_3$ ratio which is important. This is not necessarily the same ratio as would be indicated by conventional wet chemical analysis. Especially, this is the case when dealumination has been accomplished by high temperature steaming treatments wherein aluminum-containing tetrahedral units of the zeolite are destroyed, but the aluminum values remain, at least in part, in the zeolite crystals. For such zeolite products resort must be had to other analytical methods such as X-ray and NMR. One such steam-treated zeolite Y composition, denominated LZ-10, has been found to be particularly useful in the practice of the present process, especially when utilized in combination with the silica polymorph silicalite. The process for preparing LZ-10 is described in detail in U.S. Pat. No. 4,331,694 and in U.S. application Ser. No. 880,561 filed Feb. 23, 1978, now abandoned. A benefit appears to be obtained by such a combination of molecular sieves in all proportions, but each type of adsorbent is preferably present in an amount of at least 10 percent based on the total weight of the two adsorbents (hydrated weight basis).

The method for contacting the ammonia source with the siliceous molecular sieve adsorbent is not narrowly critical even though other adsorbable molecular species, including water vapor are present. The process is believed to be basically an adsorptive process rather than an ion-exchanged process. The siliceous molecular sieve can be present in a formulation with diluents, carriers, dispersing media and the like, even aqueous media, and applied to the odor source in that form. The formulation may be in the form of a powder, an agglomerate, an aerosol or in shaped forms, i.e. monoliths, which can be directly applied to a concentrated source of the ammonia odor of be positioned within a zone through which a gas stream containing the ammonia molecules are entrained. Specific applications include the incorporation of the adsorbents in, foot powders, incontinence pads, cat litter, diapers, non-woven tissues and the like for the treatment of ammonia odors in bathrooms, kitchens, garbage compactors and cans, etc.

Temperature conditions at contact are not critical, but are preferable within the range of $-25°$ to $40°$ C., i.e., the ambient atmospheric temperature occurring in any season and in any geographical location. Pressure is also not a critical factor, but is preferably at least about one atmosphere. The present process is illustrated by the examples appearing hereinafter.

EXAMPLE 1.

In the present experiments ten molecular sieves adsorbent composition were each contacted with a 1.0 normal aqueous ammonium hydroxide solution. The adsorbents were:

(a) LZ-10, a steam-treated ammonium-exchanged form of zeolite Y prepared according to the procedure set forth in U.S. Pat. No. 4,331,694. The framework $Si/Al_2$ ratio was greater than 50.
(b) LZ-10, prepared by essentially the same procedure as in (a) above with minor variations in the steaming conditions. The product had a framework $Si/Al_2$ ratio of greater than 50.
(c) S-115 (silicalite) a silica polymorph prepared using a tetraalkylammonium templating agent in a reaction system to which no alumina was intentionally added. The framework $Si/Al_{b2}$ ratio was greater than 150. The templating agent was removed from the adsorbent by calcination.
(d) S-115, another silica polymorph sample prepared in essentially the same manner as in (c) above. The method for preparation of both (c) and (d) is set forth in U.S. Pat. No. 4,061,724.
(e) A mixture of equal parts by weight of (a) and (c) above.
(f) A mixture of equal parts by weight of (b) and (d) above.
(g) LZ-105, an aluminosilicate zeolite of the ZSM-5 type prepared in the absence of an organic templating agent. The framework $Si/Al_2$ ratio was about 37. The sample was activated by calcination prior to use in the testing procedure.
(h) S-130, a silica polymorph of the type described in detail in U.S. Pat. No. 4,104,294 and known in the art as TEA-silicate. The framework $Si/Al_2$ ratio was about 400. The templating agent used in synthesis had been removed by calcination.
(i) F-70, a sample of the aluminosilicate zeolite F as described in detail in U.S. Pat. No. 2,996,358. The sample had been prepared for testing as an ion-exchange medium for removing ammonia from waste water streams. The framework $Si/Al_2$ ratio about 2.
(j) W-85, a sample of the aluminosilicate zeolite W as described in detail in U.S. Pat. No. 3,012,853. The sample had been prepared for testing as an ion-exchange medium for removing ammonia from waste water. The framework $Si/Al_2$ ratio was between 4 and 5.

In the test procedure the aqueous ammonium hydroxide solution was added to the dry zeolite powder sample in incremental amounts and mixed well after each addition. After each addition and mixing, the sample was smelled to determine if any odor of ammonia could be detected. If there was no odor detection, an addition increment of the $NH_4OH$ solution was added. Addition of $NH_4OH$ solution was terminated upon the first detection of ammonia odor. The amount of ammonia adsorbate contained by each sample at termination is set forth below:

TABLE I

| Adsorbed | $NH_4OH$ Absorbed, (wt %) | $NH_3$ Adsorbed, (wt %) |
|---|---|---|
| a | 68.4 | 1.07 |
| b | 57.1 | 0.89 |
| c | 26.0 | 0.47 |
| d | 28.9 | 0.52 |
| e | 38.5 | 0.76 |
| f | 51.2 | 1.03 |
| g | 14.8 | 0.25 |
| h | 51.2 | 0.87 |
| i | 25.0 | 0.43 |
| j | 12.6 | 0.21 |

Samples (a), (c), (e), (g), (h), (i) and (j) were permitted to stand at ambient room temperature for 24 hours and then again smelled to determine if the odor of ammonia was detectable. Samples (a) (e) and (h) were found to have no odor. Sample (c) gave off a very faint odor and in the case of sample (g), (i) and (j) a strong odor was still present.

Additional $NH_4OH$ solution was added to samples (a), (e) and (h) until the odor of ammonia could again be detected. For these samples the final results insofar as adsorption capacity for ammonia under odorless conditions are as follows.

TABLE II

| Adsorbed | $NH_4OH$ Absorbed, (wt %) | $NH_3$ Adsorbed, (wt %) |
|---|---|---|
| (a) | 91.6 | 1.56 |
| (e) | 60.7 | 1.03 |
| (h) | 59.3 | 1.01 |

It is apparent from the foregoing data that despite a significant ion-exchange capacity for ammonium ions, the samples of zeolite F, zeolite W and the low-silica ZSM-5 type zeolite exhibit only a modest capacity for sequestering ammonia and, more importantly, a poor capability for keeping the initially sequestered ammonia from passing to the atmosphere over the adsorbent in amounts which were readily detectable by the sense of smell. LZ-10 should particularly outstanding performance in both sequestration and odor prevention.

EXAMPLE 2.

Using samples (a), (c) (e), and (h) loaded with NH4OH (24 hours) from Example 1 (above) were heated to determine the effects of temperature increase upon the odor-suppressing properties of these adsorbent materials. Bottles containing each of the samples was placed into a water bath and heated. As the temperature of the bath reached 50° C., 65° C., 75° C. and 85° C. the bottles were smelled and the level of ammonia odor gauged. The results are set forth below:

TABLE III

| Adsorbent | Temperature | Odor Perception |
|---|---|---|
| (a) | 50 | Very, very faint |
|  | 65 | Faint |
|  | 75 | Faint |
|  | 85 | None to very faint |
| (c) | 50 | Medium |
|  | 65 | Faint |
|  | 75 | Medium |
|  | 85 | Medium |
| (h) | 50 | Medium |
|  | 65 | Faint |
|  | 75 | Strong |
|  | 85 | Strong |
| (e) | 50 | Faint |
|  | 65 | Very, very faint |
|  | 75 | Faint |
|  | 85 | Faint |

The apparent preference for the adsorbents of the present invention for ammonia over less polar adsorbates can be used to advantage in such applications as the prevention of ammonia odor development in diapers. The adsorbent is first pre-loaded with a pleasant fragrance (perfume) before being incorporated into the diaper article. Because the adsorbents are hydrophobic, the initial contact with water during use of the diaper causes only a modest release of the adsorbed fragrance, but upon the generation of ammonia by normal bacterial action, the fragrance is rapidly desorbed by the adsorbed ammonia, which signals the need for diaper change.

What is claimed is:

1. Process for sequestering ammonia and the odor associated therewith from the environment which comprises contacting and adsorbing at a temperature of from $-25°$ C. to $100°$ C. the ammonia with a crystalline siliceous molecular sieve which has been at least partially activated, has the faujasite crystal structure, has pore diameters large enough to adsorb ammonia, has a capacity for adsorbed water not greater than 10 weight percent when measured at 25° C. and a water vapor pressure of 4.6 torr and has a framework $SiO_2/Al_2O_3$ ratio of at least 50, said contacting and adsorbing of said ammonia being to a sufficient degree that residual concentration thereof over the adsorbent are below the detection threshold of the human sense of smell.

2. Process according to claim 1 wherein the siliceous molecular sieve has a capacity for adsorbed water of not greater than 6 weight percent.

3. Process according to claim 1 wherein the siliceous molecular sieve is an aluminosilicate having a framework $SiO_2/Al_2O_3$ molar ratio of from 200 to 500.

4. Process according to claim 1 wherein the siliceous molecular sieve comprises a mixture of a silica polymorph and an aluminosilicate having a framework $SiO_2/Al_2O_3$ molar ratio of from 200 to 500.

5. Process according to claim 4 wherein the aluminosilicate is LZ-10.

6. Process for detecting the generation of ammonia by the action of bacteria on nitrogen-containing organic matter which comprises imparting to or maintaining in the environment of the nitrogen-containing organic matter in contact with the said bacteria a crystalline siliceous molecular sieve which has been at least partially activated, has pore diameters large enough to adsorb ammonia, has a capacity for adsorbed water not greater than 10 weight percent when measured at 25° C. and a water vapor pressure of 4.6 torr and has a framework $SiO_2/Al_2O_3$ ratio of at least 50, said molecular sieve containing in the adsorbed state a fragrance readily detected by the human sense of smell whereby any ammonia generated in said environment is adsorbed and displaces the said fragrance as an indication that ammonia is being generated.

* * * * *